United States Patent [19]

Takayama

[11] Patent Number: 4,665,446
[45] Date of Patent: May 12, 1987

[54] MAGNETIC RECORDING AND REPRODUCING APPARATUS

[75] Inventor: Makoto Takayama, Kanagawa, Japan

[73] Assignee: Canon Kabushiki Kaisha

[21] Appl. No.: 657,761

[22] Filed: Oct. 4, 1984

[30] Foreign Application Priority Data

Oct. 6, 1983 [JP] Japan .............................. 58-155409[U]
Oct. 6, 1983 [JP] Japan .............................. 58-155410[U]

[51] Int. Cl.⁴ ....................... G11B 15/12; G11B 15/04
[52] U.S. Cl. ........................................... 360/62; 360/60
[58] Field of Search ....................... 360/62, 61, 60, 67, 360/68

[56] References Cited

U.S. PATENT DOCUMENTS 3,833,920  9/1974  Camras .................................... 360/62
3,959,817  5/1976  Honjo et al. ........................... 360/62
4,053,936  10/1977  Foust, Jr. .............................. 360/62
4,203,139  5/1980  Horiuchi ................................ 360/62

FOREIGN PATENT DOCUMENTS 52-50218  4/1977  Japan ...................................... 360/63

Primary Examiner—Vincent P. Canney
Attorney, Agent, or Firm—Toren, McGeady and Goldberg

[57] ABSTRACT

A magnetic recording and reproducing apparatus which comprises recording and reproducing means including a magnetic recording/reproducing head and a capacitor connected in series to one end of the head winding to remove the DC component of a recording current flowing to the head; recording/reproduction switch-over apparatus including first and second switching circuits which are respectively grounded on the sides opposite the sides associated with the wiring of the head; and inhibiting apparatus for inhibiting the recording/reproduction switch-over apparatus from operating as a result of a variation in the potential of one terminal of the capacitor.

12 Claims, 12 Drawing Figures

FIG. 1
PRIOR ART
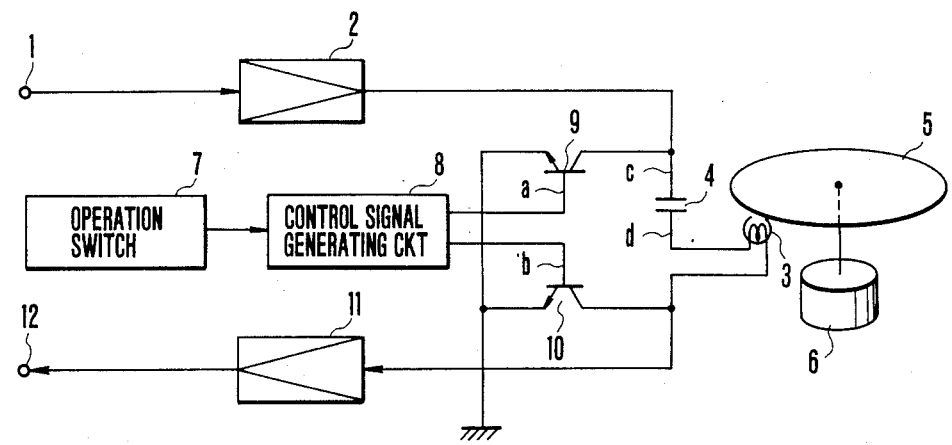
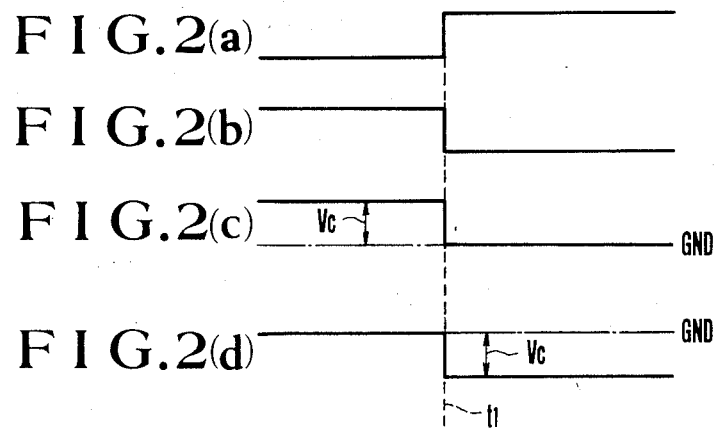
FIG. 2(a)
FIG. 2(b)
FIG. 2(c)
FIG. 2(d)

MAGNETIC RECORDING AND REPRODUCING APPARATUS

BACKGROUND OF THE INVENTION

1. Field of the Invention

This invention relates to a magnetic recording and reproducing apparatus and more particularly to an apparatus using a magnetic head for both recording and reproducing with the head switched over between recording and reproducing operations by a switching circuit.

2. Description of the Prior Art

Until now, the apparatus of the above-stated kind has been arranged as follows: FIG. 1 of the accompanying drawings shows, by way of example, the arrangement of the essential parts of the conventional apparatus of this kind. In this example, the apparatus gives a still picture by recording with a fixed magnetic head, a video signal on a rotating magnetic sheet while forming circular recording tracks on the magnetic sheet with one field portion of the video signal recorded in each of these tracks. Then one field portion of the video signal is reproduced continuously with the magnetic head. The apparatus is so arranged that it begins to reproduce the track immediately after recording completion, permitting confirmation of the recorded picture by means of a monitor or the like. FIGS. 2(a) and 2(d) show, in a timing chart, the wave forms of the various parts "a" to "d" shown in FIG. 1. The operations of these parts of the apparatus will be understood from the following description: Referring to FIG. 1, the apparatus includes an input terminal 1 which receives a video signal to be recorded; a recording amplifier 2; a magnetic head 3; a capacitor 4; a magnetic sheet 5; a motor 6; an operation switch 7; a control signal generating circuit 8 which generates a control signal for switching-over between recording and reproducing operations; transistors 9 and 10 which function as analog switches; a reproduction pre-amplifier; and an output terminal for producing a reproduced video signal.

In recording, the control signal generating circuit 8 supplies the transistor 9 with a low level control signal and the transistor 10 with a high level control signal. The transistor 9 thus turns off and the other transistor 10 turns on. The video signal received via the terminal 1 is amplified up to a predetermined level by the recording amplifier 2. A DC component of the amplified video signal is removed by the capacitor 4. The signal is then passed through the magnetic head 3 as a recording current. As a result, a current flows to the transistor 10. Then, a magnetic field generated at the magnetic head 3 is recorded in a circular recording track on the magnetic sheet 5. Meanwhile, the motor 6 rotates the magnetic sheet 5 at a predetermined rotation frequency.

In reproduction, a high level control signal is supplied to the transistor 9 and a low level control signal to the transistor 10. The transistor 9 turns on and the transistor 10 turns off. A signal reproduced by the magnetic head 3 from the magnetic sheet 5 is amplified to a suitable level by the reproduction pre-amplifier 11 and is produced from the terminal 12 as a reproduced video signal. The magnetic sheet 5 in this case is, of rotated by the motor 6 at the same rotational frequency.

Referring now to the timing chart of FIGS. 2(a) to 2(d), the switch-over from a recording operation to a reproducing operation is as follows: At the time of recording, the transistor 9 is off and the transistor 10 on. Therefore, the potential of a part "c" of FIG. 1 is equal to the DC component of the voltage output of the recording amplifier 2 (let us assume that this potential is Vc). The potential of a part "d" of FIG. 1 is at about a ground potential GND. Upon completion of recording, a signal which instructs reproduction is supplied from the operation switch 7 to the control signal generating circuit 8 at a point of time t1 shown in FIGS. 2(a) to 2(d). Then, the level of the control signal supplied to the transistor 9 becomes high and that of the control signal supplied to the transistor 10 becomes low. Therefore, the transistor 9 turns on and the transistor 10 turns off. At this time, the potential on one side "c" of the capacitor 4 drops to the ground potential GND while keeping the potential difference between the two sides of the capacitor 4 at a value Vc. As a result, the potential on the other side "d" of the capacitor 4 drops to a minus potential value. At this time, the low level control signal is supplied to the base of the transistor 10. However, since the collector potential of the transistor 10 becomes lower than the emitter potential, the transistor 10 operates in the reverse direction. In other words, the electric charge accumulated at the capacitor 4 is discharged by a loop formed by the transistor 9, the capacitor 4, the head 3 and the transistor 10. Accordingly, a spike-like current flows to the head 3. Therefore, after recording completion, the head 3 further performs recording based on this spike-like current. As a result, a part of the signal recorded is erased. When the recorded signal is reproduced, the still picture thus obtained has a portion of the picture missing.

FIG. 3 shows the essential parts of an apparatus of this kind as another example of the prior art arrangement. In this case, a current due to an electric charge accumulated at a capacitor 4' is arranged so that it is not allowed to flow to the head 3, by removing the capacitor 4' from a part between the transistors 9 and 10 which function as analog switches. In accordance with this arrangement, the above-stated spike-like current does not flow at the time of switch-over from recording to reproduction. However, if the amplitude of a recording signal is large at the time of recording, the transistor 9 might operate in a direction reversed from its operating direction, since the potential of part "e" shown in FIG. 3 is close to the ground potential GND. In that event, the recording signal would be clipped.

It is an object of the present invention to solve the above-stated problems of conventional magnetic recording and reproducing apparatus in a simple and effective manner.

It is another object of the invention to provide a magnetic recording and reproducing apparatus in which no distortion takes place in a recording current and, after completion of a recording, no spike-like current is produced.

These and further objects and features of the invention will become apparent from the following detailed description of the embodiments thereof taken in conjunction with the accompanying drawings.

SUMMARY OF THE INVENTION:

With these objects, a magnetic recording and reproducing apparatus embodying an aspect of this invention comprises recording and reproducing means including a magnetic recording/reproducing head and a capacitor which is connected in a series to one end of the winding of the head and which removes the DC component of a recording current flowing to the head; recording/reproduction switch-over means including first and second switching circuits which are respectively grounded on the sides opposite the sides associated with the wiring of the head; and inhibiting means for inhibiting the recording/reproduction switch-over means from operating as a result of a variation in the potential of one terminal of the capacitor.

BRIEF DESCRIPTION OF THE DRAWINGS:

FIG. 1 is a block diagram showing, by way of example, the arrangement of the essential parts of the conventional recording and reproducing apparatus.

FIGS. 2(a) to 2(d) show, in a timing chart, the wave forms of the various parts shown in FIG. 1.

Figure 4:
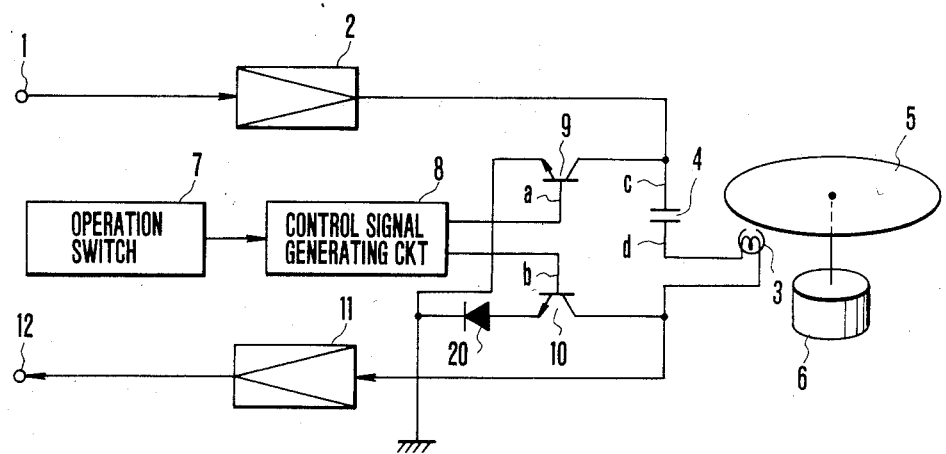
FIGS. 4, 5, 6, 7, 8 and 9 show, in diagrams, the essential parts of magnetic recording and reproducing apparatus arranged in an embodiment of the present invention.

DETAILED DESCRIPTION OF THE PREFERRED EMBODIMENTS:

The following description shows examples of still picture recording and reproducing apparatus to which the present invention is applied:

FIG. 4 shows an arrangement of the essential parts in an embodiment of the invention. The same components as those shown in FIG. 1 are identified by the same reference numerals. The embodiment includes a diode 20 which forms an analog switch in conjunction with the transistor 10.

In recording, a high level control signal is supplied to the transistor 10 to turn it on. With the transistor 10 turned on, the diode 20 also turns on, since it is then biased in the forward direction. Under this condition, the head 3 performs recording in the same manner as the apparatus shown in FIG. 1. In reproduction, the level of the control signal supplied to the transistor 10 is low in order to make the transistor 10 inoperative. A diode 20 is also off since there is no bias. Therefore, the head 3 performs a reproducing operation on a video signal in the same manner as with the conventional apparatus shown in FIG. 1.

For the switch-over from recording to reproduction, the potential level of the collector of the transistor 10 drops to a minus value in the same manner as the apparatus of FIG. 1. In this case, however, the diode 20 remains off as it is reversely biased while the collector of the transistor 10 has the minus potential. Accordingly, the switch-over from recording to reproduction never causes the electric charge, which is accumulated at the capacitor 4, to be discharged. Unlike the conventional apparatus, therefore, the embodiment never erases a portion of the recording current. In this instance, if the collector potential of the transistor 10 becomes lower than the base potential thereof, a current flows from the base to the collector. However, if the control signal to be supplied to the base of the transistor 10 is supplied via a resistor, the current value can be limited by means of this resistor. Furthermore, with respect to the reverse bias for the diode 20, the diode 20 would be turned on if it exceeds a Zener potential. However, it presents no problem because the power supply voltage of the recording amplifier 2 is not normally high. In the event that it should present a problem, however, another diode may be connected to the diode 20 in a multistage manner.

Figure 5:
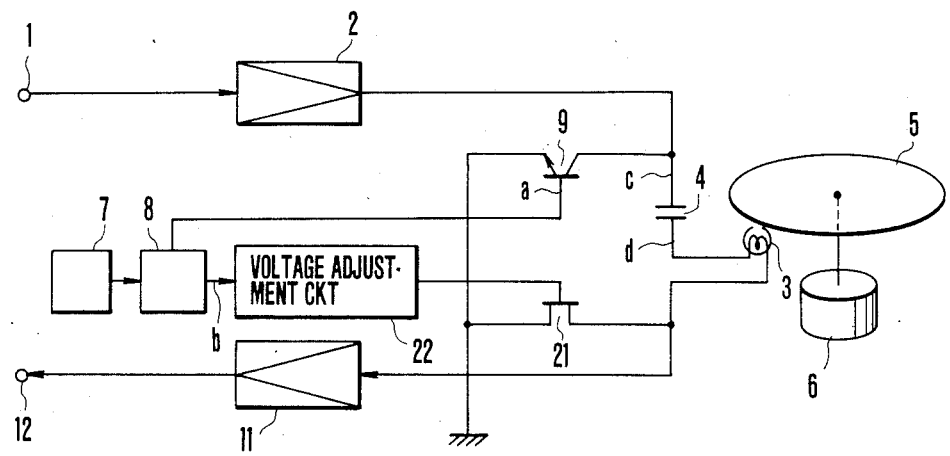

FIG. 5 shows the arrangement of essential parts in another embodiment of this invention. In FIG. 5, the same components as those shown in FIG. 1 are identified by the same reference numerals. This embodiment is provided with a field effect transistor 21 (hereinafter referred to as FET) and a voltage adjustment circuit 22. The control signal which is supplied to the transistor 10, such as the apparatus of FIG. 1, is supplied to this voltage adjustment circuit 22. The circuit 22 produces a high level potential output in recording and a minus potential output which brings the FET 21 into a pinch-off condition.

In recording, the voltage adjustment circuit 22 raises the gate potential of the FET 21 to a high to turn it on. Then, the embodiment operates in the same manner as the apparatus of FIG. 1. In reproduction, the voltage adjustment circuit 22 causes the gate potential of the FET 21 to become a minus potential to bring the FET 21 into a pinch-off condition. Accordingly, the embodiment also performs a reproducing operation in the same manner as the apparatus of FIG. 1.

For switch-over from recording to reproduction, the gate potential of the FET 21 becomes the minus potential, as mentioned above, immediately after the switch-over. The FET 21 is then in a pinch-off condition and remains off. Therefore, no spike-like current flows to the head 3 by discharge of the electric charge accumulated at the capacitor 4.

Figure 6:
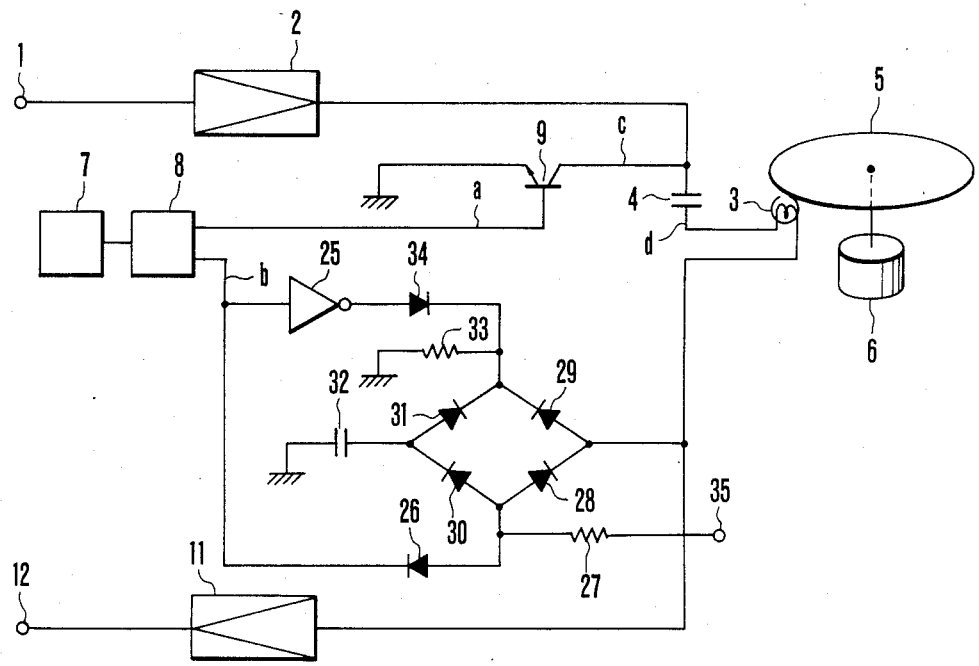

FIG. 6 shows an arrangement of the essential parts in another embodiment of the invention. The components of the embodiment, which are the same as those of the apparatus shown in FIG. 1, are identified by the same reference numerals. This embodiment includes an inverter 25; diodes 26, 28, 29, 30, 31 and 34; resistors 27 and 33; a capacitor 32; and a terminal 35 which receives a power supply voltage. A diode bridge, which is formed by the diodes 28-31, serves as an analog switch or a switching circuit corresponding to the transistor 10 of FIG. 1. In recording, a control signal impressed on a point "b" of FIG. 6 is at a high level. Therefore, the output of the inverter 25 is at a low level. The diode 34 has a reverse bias and turns off. The diode bridge 28-31 is then biased forwardly by the resistors 27 and 33, one after another. All the diodes 28-31 turn on. A recording current, therefore, flows through the capacitor 4, the head 3, the diodes 28 and 29, the diodes 30 and 31 and the capacitor 32. In reproduction, the control signal, which is impressed on the point "b" of FIG. 6, is at a low level. The diodes 24 and 34 are both forwardly biased and turn on. Accordingly, all the diodes 28-31 are reversely biased and turn off. No current flows to the capacitor 32. A reproduced signal is produced after it is amplified to a suitable level by the amplifier 11 through the transistor 9, the capacitor 4, and the head 3.

Next, the operation of the embodiment at the time of switch-over from recording to reproduction is as follows: On this occasion, the potential at point "d" in FIG. 6 becomes a minus level in the same manner as in the preceding embodiment described in the foregoing. The diodes 29, 30 and 31 then turn off while the diode 28 is forwardly biased and turns on. With the diode 28 thus turned on, the level on the anode side of the diode 28 becomes a minus level. This causes the diode 26 to have a reverse bias and to turn off. Accordingly, a current then flows from the terminal 35 via the resistor 27 and the diode 28. In this case, it is possible to restrict any spike-like current from flowing to the magnetic head 3 by setting this resistor 27 at a suitable resistance value.

In the embodiments shown in FIGS. 4–6, the positions of the head 3 and the capacitor 4 may be interchanged.

Figure 3:
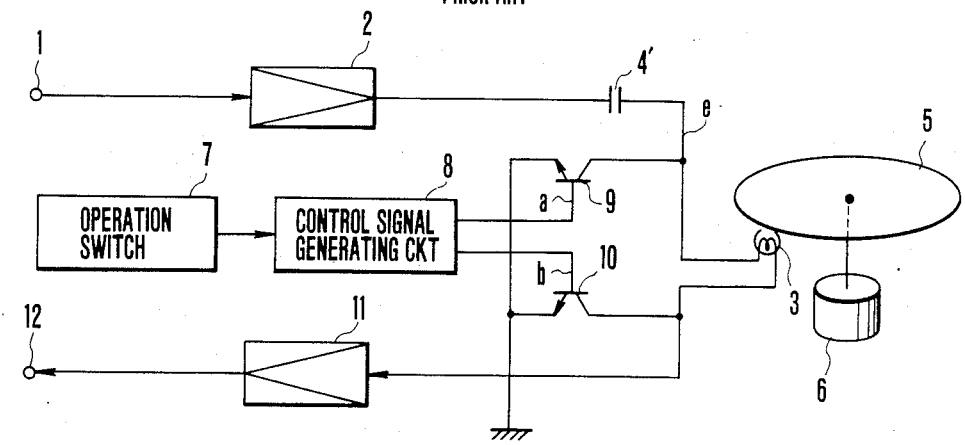
FIG. 3 is a block diagram which shows another example of the arrangement of the essential parts of the conventional recording and reproducing apparatus.
Figure 7:
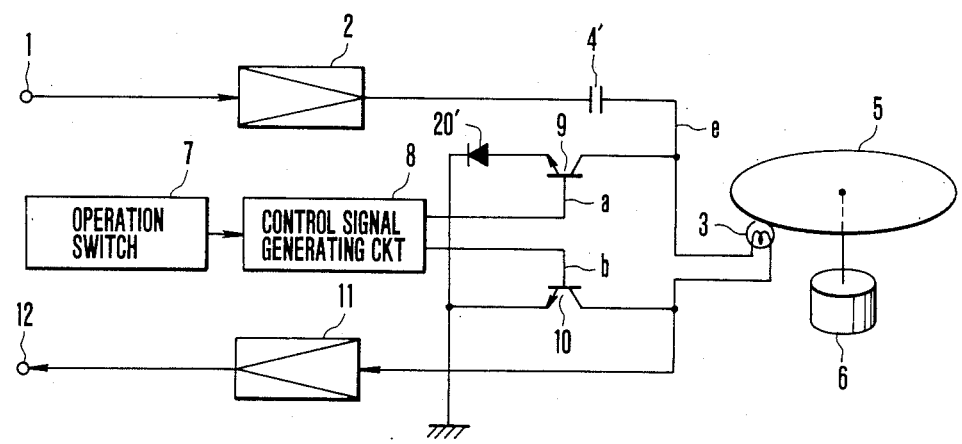

FIG. 7 shows an arrangement of the essential components in a further embodiment of the invention. In FIG. 7, the same components as those shown in FIG. 3 are identified by the same reference numerals. The embodiment has a diode 20' which forms an analog switch in conjunction with the transistor 9.

In recording, the transistor 9 is off, since a control signal supplied thereto is at a low level. A diode 20' is also off as there is no bias. Furthermore, even if the level of potential at a point "e" is at a slightly minus level with a recording current supplied, the diode 20' remains off since it is biased in the negative direction. Therefore, there is not current flow between the collector and the emitter of the transistor 9. In the event of a large amplitude of the recording current, however, a current flows from the base to the collector of the transistor 9 as the potential of the collector of the transistor 9 becomes lower than that of the base. However, this base-collector current can be restricted by arranging a resistor between the control signal generating circuit 8 and the transistor 9. Furthermore, regarding the reverse bias for the diode 20', when it exceeds a Zener potential, the transistor 9 operates in the reverse direction turning on the diode 20'. This problem can be solved by connecting another diode to the diode 20' in a multistage manner.

In reproduction, the control signal supplied to the transistor 9 is at a low level and the transistor 10 is on. The diode 20' turns on as it is forwardly biased. Therefore, the head 3 reproduces a video signal in the same manner as the apparatus shown in FIGS. 1 and 3.

At the time of switch-over from recording to reproduction, both the transistor 9 and the diode 20' turn on. The electric charge accumulated at the capacitor 4 flows to the ground GND via the transistor 9 and the diode 20', and no spike-like current flows to the head 3. Therefore, no part of the recorded signal is erased and the reproduced signal never misses any part thereof.

Figure 8:
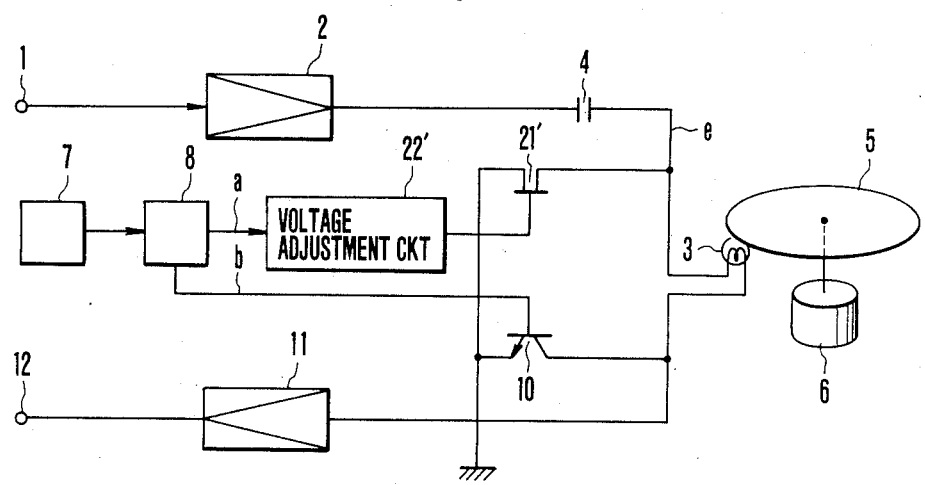

FIG. 8 shows an arrangement of the essential parts in a further embodiment. The same components as those shown in FIG. 3 are identified by the same reference numerals. This embodiment includes an FET 21' and a voltage adjustment circuit 22' as shown in FIG. 8. The control signal, which is supplied to the transistor 9 in the case of FIG. 3, is supplied to a voltage adjustment circuit 22' in this case. The circuit 22' produces a high level output at the time of reproduction and produces, at the time of recording, a minus potential output which brings an FET 21' into a pinch-off state. In recording, the output of the voltage adjustment circuit 22' brings the FET 21' into a pinch-off state and the FET 21' remains off even when the level of the recording current becomes a minus level. Therefore, the entire recording current flows through the head 3 and the transistor 10, so that recording can be accomplished without any distortion. In reproduction, the voltage adjustment circuit 22' causes the level of the gate potential of the FET 21' to become a high level. This turns the FET 21' on and the embodiment operates in the same manner as the apparatuses shown in FIGS. 1 and 3.

Figure 9:
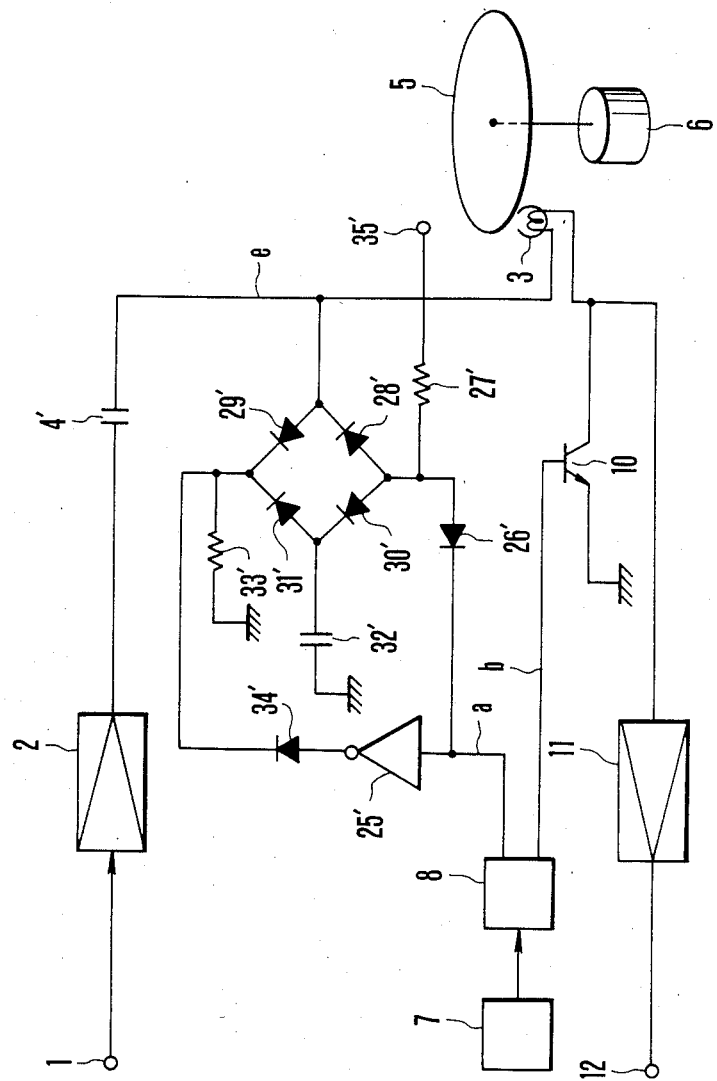

For the occasion of switch-over from recording to reproduction, the electric charge accumulated at the capacitor 4 flows to the ground GND as the FET 21' then turns on. The electric charge therefore, is not supplied to the head 3. Accordingly, no such spike-like current that is mentioned in the foregoing flows to the head 3 and thus the embodiment is free of a problem such that a part of the recorded signal is erased FIG. 9 shows an arrangement of the essential parts of a further embodiment of the invention. In FIG. 9, the same components as those shown in FIG. 3 are indicated by the same reference numerals. This embodiment includes an inverter 25'; diodes 26', 28', 29', 30', 31' and 34'; resistors 27' and 33'; a capacitor 32'; and a terminal 35' which is arranged to receive a power supply voltage. The diodes 28'–31' form a diode bridge which serves as an analog switch.

In recording, a control signal impressed on a point "a" of FIG. 9 is at a low level. The diode 26' has a forward bias and turns on. Then, since the output level of the inverter 25' becomes high, the diode 34' also turns on as it also has a forward bias. All the diodes 28', 29', 30' and 31' which form the diode bridge then come to have a reverse bias and thus turn off. Therefore, a recording current flows to the transistor 10 and the head 3, which performs recording on the magnetic sheet. Even if the potential level at a point "e" becomes a minus level due to large amplitude of the recording current, the diode 28' remains off if the level of the point "a" is at a sufficiently low level (a minus level). Therefore, the recording current will never be clipped.

In reproduction, the control signal impressed on point "a" of FIG. 9 is at a high level. Both the diodes 26' and 34' then have a reverse bias and turn off. Therefore, all the diodes 28', 29', 30' and 31 have a forward bias and thus turn on. This causes a reproduction current to pass through the diodes 28' and 29', the diodes 30' and 31' and the capacitor 32. Then, the embodiment performs a reproducing operation in the same manner as the preceding embodiments.

When the recording operation is switched over to the reproducing operation, an electric charge accumulated at the capacitor 4' flows to the diode bridge consisting of the diodes 28', 29', 30' and 31'. Therefore, no spike-like current flows to the head 3.

In accordance with the present invention, as has been described in the foregoing description of embodiments thereof, the apparatus of the kind using a magnetic head for recording and reproduction never has the recording current distorted and is also capable of inhibiting a spike-like current from flowing to the magnetic head at the time of switching from recording to reproduction. The magnetic recording and reproducing apparatus, therefore, ensures a satisfactory operation.

What is claimed is:

1. A magnetic recording and reproducing apparatus comprising:
    (a) recording and reproducing means including a magnetic recording and reproducing head and a capacitor which is connected in series to one end of the coil of the head and is arranged to remove the DC component of a recording current flowing to said coil;
    (b) recording/reproduction switch-over means including first and second switching circuits which are respectively grounded on the sides opposite to the sides associated with the coil of said head;
    (c) control means for generating a switch-over control signal which turns on either of said first and second switching circuits; and (d) inhibiting means for inhibiting at least one of said first and second switching circuits from operating in response to said switch-over control signal, due to a variation in the potential of one terminal of said capacitor.

2. An apparatus according to claim 1, further comprising manually operable means for giving instructions to said control means.

3. A magnetic recording and reproducing apparatus comprising:
   (a) recording and reproducing means including a magnetic recording and reproducing head and a capacitor which is connected in series to one end of the coil of the head and is arranged to remove the DC component of a recording current flowing to said coil;
   (b) recording/reproduction switch-over means including first and second switching circuits which are arranged to ground two terminals of said recording and reproducing means respectively;
   (c) control means for generating a switch-over control signal which turns on either of said first and second switching circuits, said control means being arranged to render said first switching circuit conductive at the time of recording and said second switching circuit conductive at the time of reproduction; and
   (d) inhibiting means for inhibiting said first switching circuit from operating in response to said switch-over control signal, due to a variation in the potential of one terminal of said capacitor.

4. An apparatus according to claim 3, wherein at the time of switch-over from recording to reproduction, said inhibiting means inhibits said first switching circuit from being rendered conductive when the voltage of one terminal of said capacitor changes.

5. An apparatus according to claim 3, wherein said first switching circuit includes a transistor and said inhibiting means includes a diode which is connected in series with said transistor.

6. An apparatus according to claim 3, wherein said first switching circuit includes a field effect transistor and said inhibiting means includes a voltage adjustment circuit arranged to produce a minus potential output which brings said transistor into a non-conducting state at the time of reproduction.

7. An apparatus according to claim 3, wherein said first switching circuit includes a bridge consisting of four diodes and said inhibiting means includes a circuit which applies a foward bias to said bridge and a circuit which applies a reverse bias to said bridge according to said control signal.

8. A magnetic recording and reproducing apparatus comprising:
   (a) recording and reproducing means including a magnetic recording and reproducing head and a capacitor which is connected in series to one end of the coil of the head and is arranged to remove the DC component of a recording current flowing to said coil;
   (b) recording/reproduction switch-over means including a first switching circuit which is arranged to ground a connection point between said coil and said capacitor and a second switching circuit which is arranged to ground one terminal disposed on a side opposite to said connection point relative to said head;
   (c) control means arranged to generate a swtich-over control signal which is arranged to turn on either said first or second switching circuit, said control means being arranged to render said second switching circuit conductive at the time of recording and to render said first switching circuit conductive at the time of reproduction; and
   (d) inhibiting means for inhibiting said first switching circuit from operating in response to said switch-over control signal, due to a variation in the potential of one terminal of said capacitor.

9. An apparatus according to claim 8, wherein said inhibiting means is arranged to inhibit said first switching circuit from being rendered conductive by a large aplitude variation in said recording current.

10. An apparatus according to claim 8, wherein said first switching circuit includes a transistor and said inhibiting means includes a diode which is connected in series with said transistor.

11. An apparatus according to claim 8, wherein said first switching circuit includes a field effect transistor and said inhibiting means includes a voltage adjustment circuit arranged to produce a negative potential output which brings said transistor into a nonconducting state at the time of reproduction.

12. An apparatus according to claim 8, wherein said first switching circuit includes a bridge consisting of four diodes and said inhibiting means includes a circuit which applies a forward bias to said bridge and a circuit which applies a reverse bias to said bridge according to said control signal.

* * * * *